United States Patent
Vigneras et al.

(10) Patent No.: US 11,044,189 B2
(45) Date of Patent: Jun. 22, 2021

(54) NETWORK OF EQUIPMENT INTERCONNECTED BY SWITCHES INCORPORATING ROUTING TABLES

(71) Applicant: BULL SAS, Les Clayes sous Bois (FR)

(72) Inventors: Pierre Vigneras, Angervilliers (FR); Jean Noël Quintin, Bourg la Reine (FR)

(73) Assignee: BULL SAS, Les Clayes sous Bois (FR)

( * ) Notice: Subject to any disclaimer, the term of this patent is extended or adjusted under 35 U.S.C. 154(b) by 0 days.

(21) Appl. No.: 15/573,697

(22) PCT Filed: Apr. 29, 2016

(86) PCT No.: PCT/FR2016/051012
§ 371 (c)(1),
(2) Date: Nov. 13, 2017

(87) PCT Pub. No.: WO2016/181050
PCT Pub. Date: Nov. 17, 2016

(65) Prior Publication Data
US 2018/0102962 A1    Apr. 12, 2018

(30) Foreign Application Priority Data
May 13, 2015    (FR) ..................... 15 54289

(51) Int. Cl.
*H04L 12/755* (2013.01)
*H04L 12/741* (2013.01)
*H04L 12/707* (2013.01)

(52) U.S. Cl.
CPC ............ *H04L 45/021* (2013.01); *H04L 45/22* (2013.01); *H04L 45/54* (2013.01)

(58) Field of Classification Search
CPC ........ H04L 45/021; H04L 45/54; H04L 45/22
(Continued)

(56) References Cited

U.S. PATENT DOCUMENTS

| 6,097,718 A | 8/2000 | Bion | |
|---|---|---|---|
| 2004/0083476 A1* | 4/2004 | Zhou | G06F 8/656 |
| | | | 718/102 |

(Continued)

FOREIGN PATENT DOCUMENTS

| EP | 2437446 A1 | 4/2012 |
|---|---|---|
| EP | 2498456 A1 | 9/2012 |
| WO | WO 01/76269 A1 | 10/2001 |

OTHER PUBLICATIONS

French Search Report related to French Application No. 15 54289 reported on Jan. 26, 2016.
(Continued)

*Primary Examiner* — Faisal Choudhury
(74) *Attorney, Agent, or Firm* — Meagher Emanuel Laks Goldberg & Liao, LLP

(57) ABSTRACT

The invention relates to a network of equipment interconnected by switches incorporating routing tables, comprising a routing table manager implementing two modes of operation, an off-line mode of operation in which all the routing tables are calculated initially, then loaded subsequently into the switches, at least when booting up the network, an on-line mode of operation in which, in case of an event rendering an element of the network not usable or operational, only the routing tables impacted by said event are recomputed and loaded into the switches, said routing tables being recomputed by a computer of the routing table manager, said recomputed routing tables being loaded by several loaders of routing tables of the routing table manager into their groups of respective switches.

18 Claims, 2 Drawing Sheets

(58) Field of Classification Search
USPC .......................................................... 370/389
See application file for complete search history.

(56) References Cited

U.S. PATENT DOCUMENTS

| | | | |
|---|---|---|---|
| 2009/0046583 A1* | 2/2009 | Towster | H04L 43/0876 370/232 |
| 2010/0014525 A1* | 1/2010 | Rehman | G06F 13/387 370/395.7 |
| 2011/0307718 A1* | 12/2011 | Aybay | H04L 49/00 713/310 |
| 2013/0322447 A1* | 12/2013 | DeCusatis | H04L 45/46 370/392 |
| 2014/0313880 A1* | 10/2014 | Lu | H04L 45/66 370/218 |
| 2016/0210255 A1* | 7/2016 | Wicki | G06F 13/4022 |
| 2017/0251431 A1* | 8/2017 | Croteau | H04W 52/0229 |

OTHER PUBLICATIONS

International Search Report related to Application No. PCT/FR2016/051012 reported on Jul. 8, 2016.

* cited by examiner

NETWORK OF EQUIPMENT INTERCONNECTED BY SWITCHES INCORPORATING ROUTING TABLES

CROSS-REFERENCE TO RELATED APPLICATION

This Application is a 35 USC § 371 US National Stage filing of International Application No. PCT/FR2016/051012 filed on Apr. 29, 2016, and claims priority under the Paris Convention to French Patent Application No. 15 54289 filed on May 13, 2015.

FIELD OF THE DISCLOSURE

The invention relates to a network of devices interconnected by switches incorporating routing tables, and to a method for updating the routing tables of this network of devices interconnected by switches incorporating routing tables.

BACKGROUND OF THE DISCLOSURE

In the prior art, a network is known in which, with each device failure or each device recovery, the set of routing tables is recalculated and directly loaded into all the switches of the network, without pre-evaluating the effectiveness of these new routing tables.

SUMMARY OF THE INVENTION DISCLOSURE

The object of the present invention is to provide a network and a method for updating the routing tables of this network which at least partially overcomes these disadvantages.

More particularly, the invention aims to provide a network and a method for updating the routing tables of the network which makes it both simple and effective to update the routing tables in a network when an event, such as device failure or device recovery, makes such an update necessary.

To make the updating of the routing tables in the network as simple and effective as possible, the invention proposes a solution for the simultaneous dual problem of minimizing network disruption when updating the routing tables and maximizing network performance while updating the routing tables.

To do so, the invention proposes, for the network and the method for updating the routing tables, both an improvement in the software architecture by operating in two modes and in the hardware architecture by distributing the routing tables across several separate loaders.

To this end, the present invention proposes a network of devices interconnected by switches incorporating routing tables, comprising a routing table manager implementing two modes of operation: an offline mode of operation in which all the routing tables are initially calculated, then subsequently loaded into the switches, at least when booting the network, and an online mode of operation mode in which, in case of an event rendering a network element not usable or operational, only the routing tables impacted by said event are recalculated and loaded into the switches, said routing tables being recalculated by a computer of the routing table manager, said recalculated routing tables being loaded by several loaders of routing tables of the routing table manager into their respective groups of switches.

To this end, the present invention also proposes a method for updating the routing tables in a network of devices interconnected by switches incorporating routing tables, comprising a routing table manager implementing two modes of operation: an offline mode of operation in which all routing tables are initially calculated, then subsequently loaded into the switches, at least when booting the network, and an online mode of operation in which, in case of an event rendering a network element not usable or operational, only the routing tables impacted by said event are recalculated and loaded into the switches, said routing tables being recalculated by a computer of the routing table manager, said recalculated routing tables being loaded by several loaders of routing tables of the routing table manager into their respective groups of switches.

Preferably, in offline mode, all routing tables are calculated for the entire topology at the beginning and are stored, but are not initially loaded into the corresponding switches.

Preferably, in online mode, all routing tables that have been modified in order to circumvent link or device failures in the network or to reinstate recovered links or devices are calculated, stored, and loaded into the corresponding switches.

In a first degraded form of the invention, or for the simultaneous dual problem of minimizing network disruption when updating routing tables and maximizing network performance while updating routing tables, where the first aspect is far more important that the second aspect, it is possible to use the dual mode of operation without the distribution of routing tables across multiple loaders.

In this case, a network of devices interconnected by switches incorporating routing tables is then proposed, comprising a routing table manager implementing two modes of operation: an offline mode of operation in which all routing tables are initially calculated, then subsequently loaded into the switches, at least when booting the network, and an online mode of operation in which, in case of an event rendering a network element not usable or operational, only the routing tables impacted by said event are recalculated and loaded into the switches.

In this case, a method for updating routing tables in a network of devices interconnected by switches incorporating routing tables is also provided, comprising a routing table manager implementing two modes of operation: an offline mode of operation in which all the routing tables are initially calculated, then subsequently loaded into the switches, at least when booting the network, and an online mode of operation in which, in case of an event rendering a network element not usable or operational, only the routing tables impacted by said event are recalculated and loaded into the switches.

In a second degraded form of the invention, or for the simultaneous dual problem of minimizing network disruption when updating routing tables and maximizing network performance while updating routing tables, where the first aspect is much less important than the second aspect, it is possible to use the distribution of routing tables across multiple loaders without the dual mode of operation.

In this case, a network of devices interconnected by switches incorporating routing tables is then proposed, comprising a routing table manager comprising: a routing table computer adapted to recalculate, in case of an event rendering a network element not usable or operational, only the routing tables impacted by said event, a plurality of routing table loaders being adapted to load into their respective groups of switches only the recalculated routing tables.

In this case, a method for updating routing tables in a network of devices interconnected by switches incorporating routing tables is then also provided, comprising a routing table manager comprising: a routing table computer adapted to recalculate, in case of an event rendering a network element not usable or operational, only the routing tables impacted by said event; and several routing table loaders adapted to load into their respective groups of switches only the recalculated routing tables.

In this manner, the calculation of the routing tables is divided into two parts. In the first part, the routing table manager is operating in offline mode, a mode in which it can calculate the complete routing tables with no real time constraints. In the second part, the routing table manager is operating in online mode, a mode in which it only calculates the routing table modifications required to circumvent the failure or failures, the limited scope of these changes enabling better management of the serious time constraints existing in this online mode.

In some embodiments, the offline mode is used when booting the network, in order to initialize all switches in the network. The routing tables thus calculated are loaded in a later phase, for example after their validation by the routing table manager. Once the routing tables are loaded into the network switches, the online mode is initiated. The routing table manager loads the previous routing tables into memory and then subscribes to events from the network, such as the loss of a link between devices or the recovery of a link between devices, or such as the loss or recovery of a device. When an event occurs, for example failure or recovery, the online mode only recalculates the changes necessary and sufficient to work around this failure, or if appropriate to reuse a previously failed link that has been recovered, meaning it has once again become available.

This online mode thus provides two main advantages. A first advantage is that the time to recalculate is reduced to what is strictly necessary, which has the effect of hiding the failure by performing the operation within a shorter time than the timeout of the MPI ("Message Passing Interface") applications which is typically 10 seconds. A second advantage is that the impact is reduced to the bare minimum; Indeed, only a few sub-portions of the network are impacted, further reducing the total number of MPI applications that are impacted.

In some embodiments, the calculation of routing tables in a network comprising N terminal devices requires the calculation of at least $N^2$ routes. Support for adaptive routing significantly further increases the number of routes to calculate. When N is large, the failure of a link is a relatively common operation that should impact applications as little as possible. Recalculating all routing tables to circumvent a failure or failures requires computing time that is difficult to hide in the applications. In addition, by thus recalculating all routing tables, the entire network of interconnections will be impacted although only part of the network was affected by the failure.

In some embodiments, the time to recalculate the routing tables affected by the failure or recovery of a network device or link is less than 10 seconds, ensuring minimal disruption to applications running on the network.

According to preferred embodiments, the invention comprises one or more of the following features which may be used separately or in partial combination with one another or in total combination with one another, with any one of the above objects of the invention.

Preferably, the routing table manager comprises an archive manager storing over time the sets of routing tables that have been used in the network as well as the corresponding network topologies. A history of successive configurations of the network routing tables is thus available and can be used for several functions.

Preferably, the last archived set of routing tables will be loaded into the computer at the next network reboot. Thus, at the next network reboot, the network will be able to operate with a set of routing tables adapted and practically optimized because the network topology will be very close to the one associated with the stored set of routing tables.

Preferably, the routing table manager comprises a routing table evaluator adapted to evaluate the performance of a set of routing tables for the corresponding network topology, before this set of routing tables is sent to the loaders. A detailed and realistic assessment can be done in particular using the stored history of successive sets of routing tables over time, which then allows validating and refining future simulations using past implementations.

Preferably, the evaluator verifies, for each set of routing tables before it is sent to the loaders, the absence of deadends in the corresponding network topology, the absence of livelock in the corresponding network topology, and the absence of deadlock in the corresponding network topology. A deadend is an address that does not exist, so that sending a data packet to this address is inevitably lost. A livelock is a packet that circulates indefinitely across multiple switches without ever reaching a terminal device of the network. Deadlock includes packets stuck in a loop, each packet being blocked by the previous one. The absence of deadends, livelock, and deadlock eliminates the biggest risks for network malfunction after the new set of routing tables is loaded.

The routing table manager has the ability to store to disk the routing tables calculated in this manner, without loading them immediately into the switches. This allows analyzing them first, particularly concerning the quality of the routing. The three main properties of good quality routing are: the absence of deadlock, the absence of livelock, and the absence of deadends. To these three main properties one can add route balancing, meaning no overutilization or underutilization of links between devices.

Preferably, the routing table manager comprises a feedback loop from the evaluator to the computer in order for the computer to perform an iterative calculation or iterative recalculation of the routing tables. The routing tables will thus be perfectly optimized, as they will be recalculated as long as they are not optimal.

Preferably, the computer implements an algorithm for selecting the routing tables to recalculate which, in case of failure of a switch, prioritizes selecting switches located in the upstream layer and downstream layer relative to the direction of data transmission in the network, and does not select switches located in the same layer, relative to the direction of data transmission, as the failed switch. This involves stopping the streams of data packets heading towards the failed switch, as close as possible upstream and downstream, in order to force them to bypass the failed switch, and also involves not disrupting or disrupting as little as possible the streams of data packets already bypassing the failed switch, because the circulation of these streams has already adjusted to the failure of the defective switch.

Preferably, the various components of the routing table manager are run as background tasks, preferably in UNIX. The routing tables are thus recalculated continuously and immediately when an event such as device failure or recovery is detected, and these routing tables are recalculated without directly interfering with the processing of data or the calculation of data being performed by all the network devices at a given time.

Preferably, the computer implements a routing algorithm which is adapted to recalculate the routing tables and which has no prior knowledge of the network topology. The routing algorithm thus remains effective regardless of where the device failure or recovery occurs, and regardless of the evolution of the failures or recoveries within the network.

Preferably, the routing table manager implements a command to control loading the routing tables into the switches. This additional control enables the routing table manager itself to load the routing tables into the switches, in a manner limited to what is strictly necessary due to the failure or recovery.

Preferably, the routing table manager uses a login identifier to obtain status updates for network devices. This login identifier allows the routing table manager itself to obtain directly the status of network devices whose evolution reflects the evolution of the network topology.

Preferably, the network devices comprise a majority of calculation nodes. The network comprises a minority of intermediate devices, such as switches, and a majority of terminal devices, such as calculation nodes. All devices are interconnected by links in the network.

The network comprises a large number of calculation nodes, preferably over 5000 calculation nodes, more preferably more than 20,000 calculation nodes, even more preferably more than 50,000 calculation nodes. This network is then considered to be a large scale fast network.

Other features and advantages of the invention will become apparent from reading the following description of a preferred embodiment of the invention, given by way of example and with reference to the accompanying drawings.

DETAILED DESCRIPTION OF THE DISCLOSURE

Figure 1:
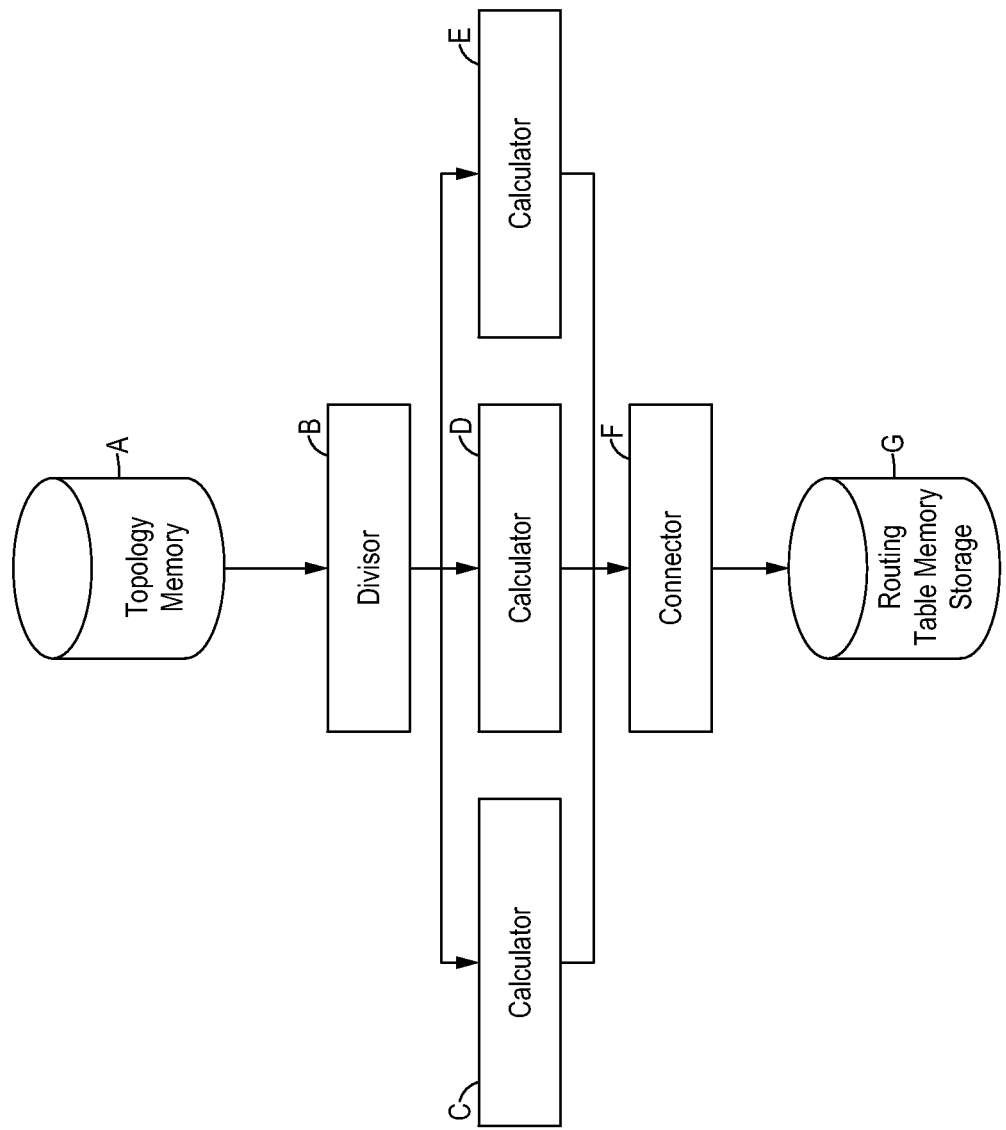
FIG. 1 schematically represents an example of the flow in offline mode in the routing table manager according to one embodiment of the invention.

FIG. 1 schematically represents an example of the flow in offline mode in the routing table manager according to one embodiment of the invention. In offline mode, the routing table manager comprises a topology memory A, a splitter B dividing the network into subparts, subpart computers C, D, and E, a connector F of subparts to routes, and a routing table storage memory G. Only three subpart computers C to E are represented in FIG. 1 for reasons of clarity, but there are generally significantly more.

The network topology is stored in memory A. The network topology is sent from the memory A to the splitter B. The splitter B separates the network into subparts which will be calculated separately, respectively by the three computers C to E. Once each subpart is calculated separately, the routes are reconstructed from these subparts interconnected by the connector F. These routes are then stored in memory G, to be loaded into the switches at the appropriate time.

Offline mode may be implemented as hardware or software which accepts an algorithm name and a topology as input, for example in the form of a file. The routing tables are output to memory; said memory may be flash memory, RAM memory, or a disk. Offline mode uses a secondary command to load the routing tables stored in memory G, into each switch of the network.

Figure 2:
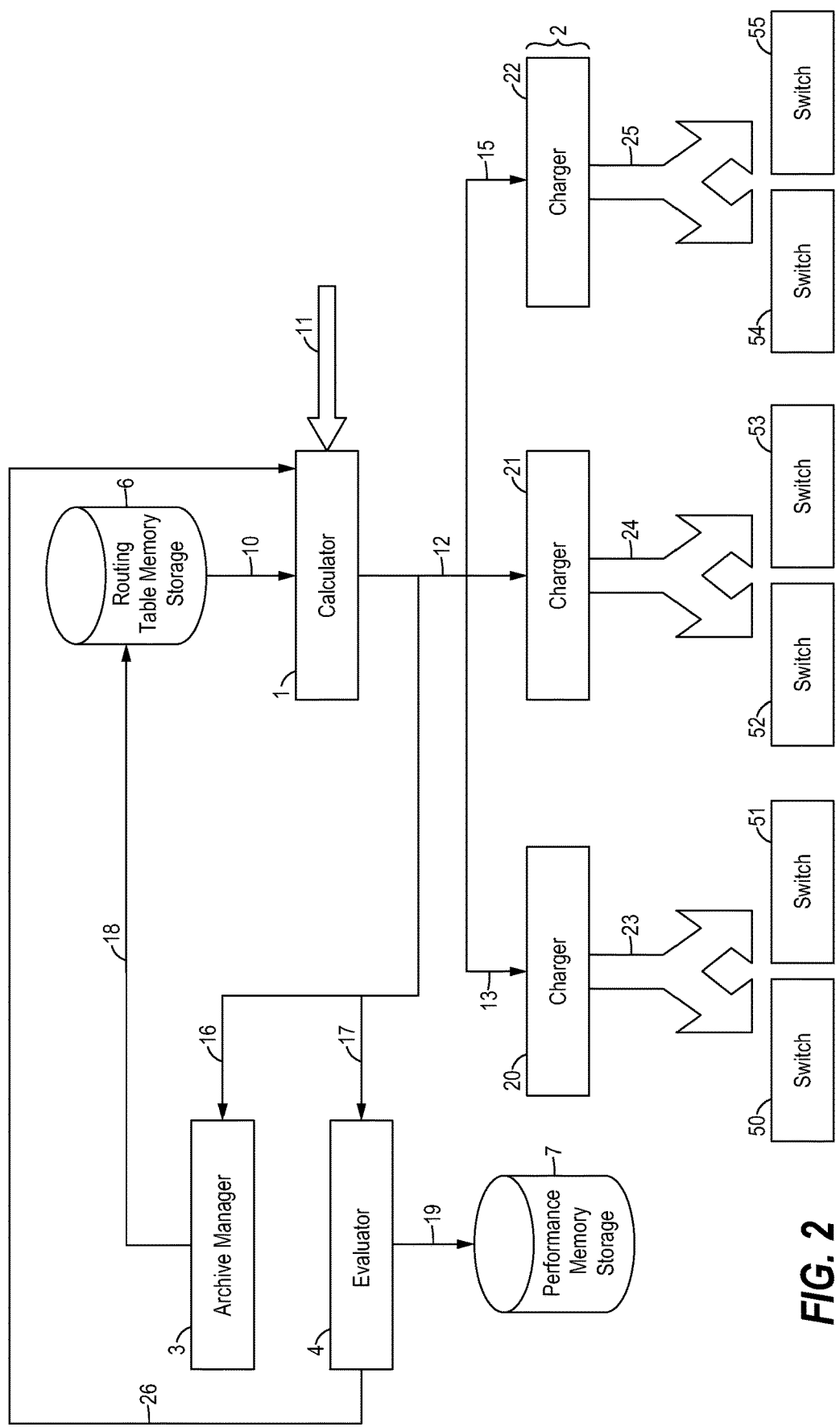
FIG. 2 schematically represents an example of the flow in online mode in the routing table manager according to one embodiment of the invention.

FIG. 2 schematically represents an example of the flow in online mode in the routing table manager according to one embodiment of the invention. The routing table manager comprises a routing table computer 1, a set 2 of loaders 20 to 22 for loading the routing tables into the switches, an archive manager 3 for the sets of routing tables, an evaluator 4 for the sets of routing tables, a set 5 of switches 50 to 55, a memory 6 for storing the sets of routing tables and associated network topologies, and a memory 7 for storing the performances of the sets of routing tables. Only three loaders 20 to 22 are represented in FIG. 2 for reasons of clarity, but there are generally significantly more. Only six switches 50 to 55 are represented in FIG. 2 for reasons of clarity, but there are generally significantly more.

A link 10 allows loading a set of routing tables into the computer 1. A link 11 allows the computer 1 to receive updates on the status of network devices. A link 12 allows publishing routing table changes previously calculated by the computer 1. Links 13 to 15 allow sending to each loader 20 to 22 the routing table subsets associated with it. Links 23 to 25 enable the distribution to each switch 50 to 55 of the routing tables associated with it, for example by means of the SNMP protocol ("Single Network Management Protocol"). Link 16 enables sending all routing tables in a set of routing tables to the archive manager 3. Link 17 allows sending all routing tables in a set of routing tables to the evaluator 4. Link 18 allows the archive manager 3 to store the set of routing tables in memory 6, associating it with the corresponding network topology. Link 19 allows the evaluator 4 to store, in memory 7, the performances of the set of routing tables as previously evaluated by the evaluator 4. Link 26 provides a feedback loop from the evaluator 4 to the computer 1 so that, by successive iterations, the evaluation of the performance of the set of routing tables in the network allows recalculating this set of routing tables until convergence.

The online mode is implemented as distributed UNIX background tasks ("daemons").

The computer 1 receives status updates concerning network devices from the network backbone, calculates changes to the routing tables, and publishes them. The computer 1 only has read access to the memory 6.

The loaders 20 to 22 receive certain modifications to the routing tables, those associated with themselves, and load them into the switches 50 to 55 associated with themselves, by means of the SNMP protocol.

The archive manager 3 receives all modifications to the routing tables and stores them in memory 6. The archive manager 3 has read access to memory 6 and write access to memory 6.

The evaluator 4 receives all modifications to the routing tables, performs performance evaluations related to these routing table modifications, and stores these performance evaluations in memory 7. The evaluator 4 has read access to memory 7 and write access to memory 7.

The online mode may be implemented as hardware or software which accepts as input an algorithm name, a topology, and a login identifier for status updates of network devices, said status being for example "device failed" or conversely "device recovered." As output, the online mode loads the routing table modifications into the switches 50 to 55 and also stores the new set of routing tables in memory 6, which is for example a disk.

An algorithm is used to recalculate a set of routing tables; it may for example be an online algorithm for PGFT ("Parallel Ports Generalized Fat-Tree") or an online algorithm with no knowledge of the network topology ("topology agnostic algorithm").

The online algorithm for recalculating the routing tables will bypass the failed links or devices, will reuse the repaired and newly operational links or devices, will perform the recalculation within a time less than the timeout of applications running on the network, usually about 10 seconds, and will detect the impossibility of recalculating routing tables because the network topology is no longer routable and in this case will so inform the system administrator.

The online algorithm for PGFT allows calculating only the routing table modifications adapted to bypass the failures that can arise in a PGFT ("fat-tree") topology. The online architecture allows using this algorithm to minimize the impact of failures on the network as a whole which constitutes a supercomputer when connected as a PGFT.

The online algorithm with no knowledge of the network topology allows calculate only the routing table modifications adapted to bypass the failures that can arise in any topology. The online architecture allows using this algorithm to minimize the impact of failures on the network as a whole which constitutes a supercomputer.

A routing table generally comprises at least the following information. First, a network identifier. Then, the next step ("next hop" or "next gateway"), which is the address of the next network element to which the data packet will be sent along its path to its final destination. A routing table may also contain one or more of the following, in order to refine the routing of data packets: for example, the quality of service associated with the route; for example, the access lists associated with the route.

Of course, the present invention is not limited to the examples and to the embodiment described and represented, but is capable of many variants accessible to the skilled person.

The invention claimed is:

1. A network of devices interconnected by switches incorporating switching routing tables, comprising a routing table manager implementing two modes of operation:
    an offline mode of operation in which all routing tables are initially calculated, then subsequently loaded into the switches, at least when booting the network,
    an online mode of operation in which, in case of an event rendering a network element not usable or operational, only the routing tables impacted by said event are recalculated and loaded into the switches so that switches can use said routing tables to route data,
    said routing tables being recalculated by a computer of the routing table manager,
    said recalculated routing tables being loaded by several loaders of routing tables of the routing table manager into their respective groups of switches,
    wherein the routing table manager comprises a routing table evaluator adapted to evaluate the performance of a set of routing tables for the corresponding network topology, before this set of routing tables is sent to the loaders,
    wherein the evaluator verifies, for each set of routing tables before it is sent to the loaders, an absence of:
        deadends in the corresponding network topology,
        livelock in the corresponding network topology,
        deadlock in the corresponding network topology,
    wherein the routing table manager comprises a feedback loop from the routing table evaluator to the computer in order for the computer to perform an iterative calculation or iterative recalculation of the routing tables.

2. The network according to claim 1, wherein the routing table implements the modes of operation as background tasks.

3. The network according to claim 1, wherein the computer implements a routing algorithm which is adapted to recalculate the routing tables and which has with no prior knowledge of the network.

4. The network according to claim 1, wherein the routing table manager implements a command to control loading the routing tables into the switches.

5. The network according to claim 1, wherein the routing table manager uses a login identifier to obtain status updates for network devices.

6. The network according to claim 1, wherein the network devices comprise a majority of calculation nodes.

7. The network according to claim 6, wherein the network comprises more than 5000 calculation nodes.

8. The network according to claim 1, wherein the routing table manager comprises an archive manager storing over time the sets of routing tables that have been used in the network as well as the corresponding network topologies.

9. The network according to claim 8, wherein the last archived set of routing tables will be loaded into the computer at the next network reboot.

10. A network of devices interconnected by switches incorporating switching routing tables, comprising a routing table manager implementing two modes of operation:
    an offline mode of operation in which all routing tables are initially calculated, then subsequently loaded into the switches, at least when booting the network,
    an online mode of operation in which, in case of an event rendering a network element not usable or operational, only the routing tables impacted by said event are recalculated and loaded into the switches so that switches can use said routing tables to route data,
    said routing tables being recalculated by a computer of the routing table manager,
    said recalculated routing tables being loaded by several loaders of routing tables of the routing table manager into their respective groups of switches,
    wherein the computer implements an algorithm for selecting the routing tables to recalculate which, in case of failure of a switch, prioritizes selecting switches located in an upstream layer and downstream layer relative to a direction of data transmission in the network, and does not select switches located in a same layer, relative to the direction of data transmission, as the failed switch.

11. The network according to claim 10, wherein the routing table manager comprises an archive manager storing over time the sets of routing tables that have been used in the network as well as the corresponding network topologies.

12. The network according to claim 11, wherein the last archived set of routing tables will be loaded into the computer at the next network reboot.

13. The network according to claim 10, wherein the routing table implements the modes of operation as background tasks.

14. The network according to claim 10, wherein the computer implements a routing algorithm which is adapted to recalculate the routing tables and which has with no prior knowledge of the network.

15. The network according to claim 10, wherein the routing table manager implements a command to control loading the routing tables into the switches.

16. The network according to claim 10, wherein the routing table manager uses a login identifier to obtain status updates for network devices.

17. The network according to claim 10, wherein the network devices comprise a majority of calculation nodes.

18. The network according to claim 10, wherein the network comprises more than 5000 calculation nodes.

* * * * *